United States Patent
Delaporte et al.

(10) Patent No.: US 11,707,808 B2
(45) Date of Patent: *Jul. 25, 2023

(54) METHOD FOR REPAIRING AN UPSTREAM RAIL OF A TURBINE ENGINE TURBINE CASING

(71) Applicant: SAFRAN AIRCRAFT ENGINES, Paris (FR)

(72) Inventors: Nicolas Daniel Delaporte, Chaumes en Brie (FR); Marina Wilma Bilioniere, Alfortville (FR); Thierry Michel Breugnot, Nangis (FR); Didier Noël Durand, Pontault Combault (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 232 days.

This patent is subject to a terminal disclaimer.

(21) Appl. No.: 16/943,795

(22) Filed: Jul. 30, 2020

(65) Prior Publication Data
US 2020/0359793 A1 Nov. 19, 2020

Related U.S. Application Data

(63) Continuation of application No. 15/510,866, filed on Jul. 17, 2017, now Pat. No. 10,759,010.

(30) Foreign Application Priority Data

Sep. 11, 2014 (FR) ........................................ 1458555

(51) Int. Cl.
*F01D 25/24* (2006.01)
*B23P 6/00* (2006.01)
(Continued)

(52) U.S. Cl.
CPC ............ *B23P 6/007* (2013.01); *A47B 96/021* (2013.01); *B23K 9/044* (2013.01); *B23K 9/048* (2013.01);
(Continued)

(58) Field of Classification Search
CPC ........ F01D 11/08; F01D 25/24; F01D 25/246; F01D 25/243; F01D 5/005; B23P 6/002;
(Continued)

(56) References Cited

U.S. PATENT DOCUMENTS 4,598,190 A 7/1986 Balleys
10,759,010 B2 * 9/2020 Delaporte ............... B23P 6/007
(Continued)

FOREIGN PATENT DOCUMENTS

EP 2 039 882 A2 3/2009
EP 2 113 330 A1 11/2009
(Continued)

OTHER PUBLICATIONS

International Search Report as issued in International Patent Application No. PCT/FR2015/052335, dated Dec. 22, 2015.
(Continued)

*Primary Examiner* — Eldon T Brockman
*Assistant Examiner* — Maxime M Adjagbe
(74) *Attorney, Agent, or Firm* — Pillsbury Winthrop Shaw Pittman LLP

(57) ABSTRACT

An upstream rail of a turbine engine turbine casing, which includes a casing body extending along a longitudinal axis, includes a base including a radial face, extending substantially radially from the casing body, a plate including an upper face, extending substantially along the longitudinal axis, a connection portion between the base and the plate, including a concave face connecting the radial and upper faces, the concave and radial faces extending on either side
(Continued)

of an edge. The upstream rail is repaired through a method including covering a surface with a solder, the surface including the upper and concave faces such that the solder extends until the edge, and machining the covered surface, in a single action, in a direction toward the radial face, so as to reshape the surface, wherein the machining of the covered surface is performed on a portion of the radial face.

5 Claims, 2 Drawing Sheets

(51) Int. Cl.
B23K 9/167 (2006.01)
B23K 9/23 (2006.01)
B23K 9/04 (2006.01)
A47B 96/02 (2006.01)
B23K 101/00 (2006.01)
B23K 103/18 (2006.01)
B23P 6/04 (2006.01)
F01D 5/00 (2006.01)
A47B 47/04 (2006.01)

(52) U.S. Cl.
CPC ............... *B23K 9/167* (2013.01); *B23K 9/23* (2013.01); *F01D 25/246* (2013.01); *A47B 47/04* (2013.01); *B23K 2101/001* (2018.08); *B23K 2103/26* (2018.08); *B23P 6/045* (2013.01); *F01D 5/005* (2013.01); *F05D 2230/10* (2013.01); *F05D 2230/235* (2013.01); *F05D 2230/80* (2013.01)

(58) Field of Classification Search
CPC .... B23P 6/007; B23P 6/045; F05D 2230/235; F05D 2230/72; F05D 2230/80; B23C 2220/28
See application file for complete search history.

(56) References Cited

U.S. PATENT DOCUMENTS

| 2009/0274553 | A1 | 11/2009 | Bunting | |
|---|---|---|---|---|
| 2011/0296685 | A1 | 12/2011 | Imano | |
| 2014/0234098 | A1* | 8/2014 | Anderson | B23P 6/007 29/402.09 |
| 2015/0026944 | A1* | 1/2015 | Engber | B23K 35/0244 29/402.13 |

FOREIGN PATENT DOCUMENTS

| EP | 2 832 489 A1 | 2/2015 |
|---|---|---|
| FR | 2 959 434 A1 | 11/2011 |

OTHER PUBLICATIONS

Written Opinion of the International Searching Authority for International Application No. PCT/FR2015/052335 (dated 2015).

* cited by examiner

METHOD FOR REPAIRING AN UPSTREAM RAIL OF A TURBINE ENGINE TURBINE CASING

CROSS-REFERENCE TO RELATED APPLICATIONS

This application is a continuation of U.S. application Ser. No. 15/510,866, filed Jul. 17, 2017, now U.S. Pat. No. 10,759,010, which is the U.S. National Stage of PCT/FR2015/052335, filed Sep. 3, 2015, which in turn claims priority to French Patent Application No. 1458555 filed Sep. 11, 2014, the entire contents of all applications are incorporated herein by reference in their entireties.

TECHNICAL FIELD OF THE INVENTION

The invention relates to the general field of members of turbine engines. It more particularly relates to a method for repairing an upstream rail of a turbine engine turbine casing.

TECHNOLOGICAL BACKGROUND OF THE INVENTION

The aeronautical turbine engines conventionally comprise several modules such as a high pressure compressor, a combustion chamber, a high pressure turbine followed by a low pressure turbine, which drive the corresponding LP or HP compressor, and a gas discharge system. Each of the turbines is formed with one or more stages, each stage successively including a stationary vane impeller or nozzle guides and a moving vane impeller.

Moving vanes are carried at their lower part by the turbine engine rotor and attached to a turbine disc. In contrast, nozzle guide vanes are held by their upper part and attached to a casing, referred to as turbine casing. The terms "lower" and "upper" are to be considered relatively to a distance to the turbine engine axis: the lower part of a piece, when said piece is fitted in the turbine engine, is closer to the turbine engine axis than the upper part of said piece.

With reference to FIG. 1, a turbine casing 10 has, in a longitudinal cross-section, a casing body 11 on which a plurality of rail couples 12 is attached, each rail couple 12 being comprised of an upstream annular rail 13 and of a downstream annular rail 14, each rail couple 12 being intended to hold guide nozzles 15 of a turbine stage. There are thus as many rail couples as turbine stages. The terms "upstream" and "downstream" are to be considered relative to a general direction of flow of fluids through the turbine engine, from upstream to downstream.

The upstream rails 13 each include a plate 16 extending axially (with reference to the axis of rotation of the turbine engine) downstream. On each upper face of the plate 16 of the upstream rail 13, an upstream hook 17 of a nozzle guide is placed, integral with a platform of the nozzle guide 18, which also extends axially upstream. The nozzle guide 18 is carried at its downstream end by the downstream rail 14 associated with the considered upstream rail 13.

After a certain working time, a wear of the upper faces of the plates of the upstream rails is noticed, resulting from micro-displacements created by vibrations and a thermal expansion differences between the upstream rails and upstream hooks. This wear can alter the tilt of nozzle guides which can then tip over around the downstream rails and degrade the engine operation.

Thus, when an upper face of an upstream rail is damaged, it is necessary to repair the rail.

A known repairing method consists in covering the upper face of the rail with a solder by welding, in order to add material, then in machining the covered face. However, this repairing method has a major drawback. The upper face is joined to a concave surface of a highly strained rail portion. A machining springback, that is a geometric discontinuity due to the exit of the machining tool, is therefore forbidden in the concave surface. Indeed, a springback would lead to a significant stress embrittling a highly strained portion. Yet, given the welding accuracy, which is in the order of a few millimetres, the solder may sometimes overflow up to the concave surface. It is thus impossible to suppress this solder, since machining the concave surface would lead to a springback in the concave surface.

Moreover, this repairing method does not enable the concave surface of the rail to be repaired when it is damaged.

GENERAL DESCRIPTION OF THE INVENTION

The object of the invention is to provide a repairing method enabling an upstream rail to be repaired while avoiding a machining springback in the concave area, and further enabling said concave area to be repaired if it is damaged.

A first aspect of the invention therefore relates to a method for repairing an upstream rail of a turbine engine turbine casing, said upstream rail being intended to support an upstream hook of a nozzle guide of a stage of said turbine. The upstream rail includes:
- a base including a face, referred to as radial face, extending substantially radially from the casing body
- a plate including a face, referred to as upper face, extending substantially along the longitudinal axis
- a connection portion between the base and the plate, including a concave face connecting the radial face and the upper face, the concave face and the radial face extending on either side of an edge.

The repairing method includes:
- a step of covering a surface with a solder, said surface including the upper face and the concave face, so that said solder extends substantially until the edge
- a step of machining the covered surface, in a single action, in the direction of the radial face, and at least until the edge, so as to reshape the surface.

Since machining is performed in a single action at least until the edge delimiting the concave face, a springback in the concave face is avoided. Furthermore, wears of the concave face are suppressed without a thickness loss of the connection portion.

Further to the characteristics which have just been mentioned in the previous paragraph, the method according to the invention can have one or more additional characteristics among the following, considered individually or according to any technically possible combinations.

In a non-limiting embodiment, machining the covered surface is performed so as to end in the radial face. The machining springback is thus localised on the radial face, which is the least strained area of the upstream rail.

In a non-limiting embodiment, the method includes a further step of machining the radial face. This step makes it possible to suppress solder residues which could have disseminated on the radial face. It is noted that the machining depth must be small so as not to embrittle the base. The machining depth is for example in the order of 0.1 millimetre.

In a non-limiting embodiment, covering is performed by Tungsten Inert Gas (TIG) welding, which enables a simple accurate welding.

In a non-limiting embodiment, the covered surface includes a side face and a lower face of the plate. Thus, machining in a single action starts at the lower face of the plate. The plate is then fully reshaped.

In a non-limiting embodiment, the solder is of the same material as the upstream rail. Thus, the rail reshaped by the method has no material discontinuities.

A second aspect of the invention relates to an upstream rail of a turbine engine turbine casing, repaired through a method according to the first aspect of the invention.

The invention and its numerous applications will be better understood upon reading the following description and upon studying the accompanying figures.

BRIEF DESCRIPTION OF THE FIGURES

Figures are presented purely by way of indicating and in no way limiting example of the invention. Figures show.

DETAILED DESCRIPTION OF AT LEAST ONE EMBODIMENT OF THE INVENTION

Figure 1:
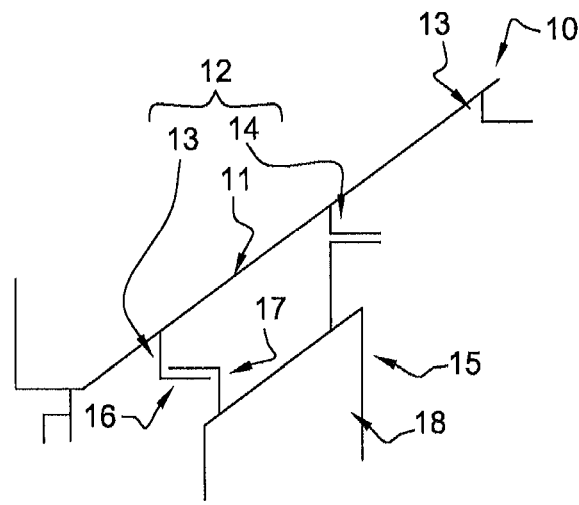
in FIG. 1, already described, a schematic representation of a casing including rails to support a nozzle guide
in FIG. 2, a schematic representation of an upstream rail of the casing of FIG. 1, in a cross-section view
in FIG. 3, a schematic representation of the steps of an embodiment of the method according to the first aspect of the invention
in FIG. 4, a schematic representation of the upstream rail of FIG. 2, depicting a covering step of the method
in FIG. 5, a schematic representation of the upstream rail of FIG. 3, depicting a machining step of the method.
Figure 2:
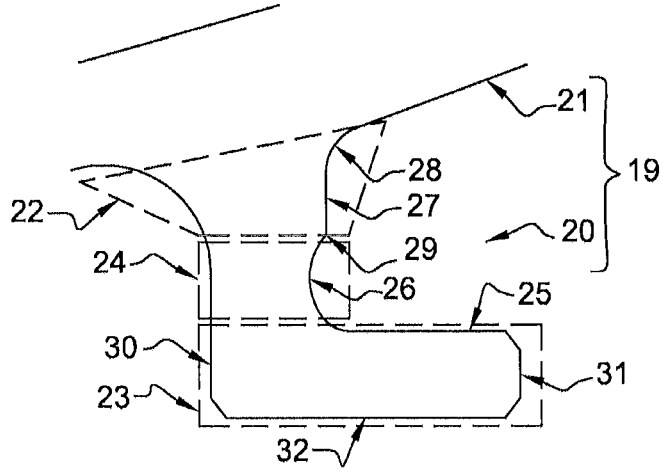

FIG. 2 shows a turbine engine casing 19, said turbine engine generally extending along a longitudinal axis. More precisely, FIG. 2 is a partial view of the casing in a longitudinal cross-section view. Said casing 19 includes a generally cylindrical casing body 21, and a plurality of rails among which an annular upstream rail 20.

In a longitudinal cross-section, the upstream rail 20 has the general shape of an L, and thus includes several parts:
a base 22 integral with the casing body 21, extending substantially radially from the casing body 21 in the direction of the longitudinal axis
a plate 23 extending substantially longitudinally from upstream to downstream
a connection portion 24 connecting the base 22 and the plate 23.

By "substantially radially" or "substantially longitudinally", it is meant a radial or longitudinal extension with more or less 5°.

The plate 23 especially includes an upstream side face 30 and a downstream side face 31 extending generally radially, and a lower face 32 extending longitudinally between the upstream side face 30 and the downstream side face 31. The plate 25 further includes an upper face 25, extending longitudinally between the connection portion 24 and the downstream side face 31. A nozzle guide upstream hook is intended to rest upon said upper face 25.

The upper face 25 of the plate 23 adjoins a concave face 26 of the connection portion 24, against which an end of the upstream hook is intended to bear.

The concave face 26 adjoins a radial face 27 of the base 22, having itself formed thereon a rounded face 28 of the base 22, said rounded face 28 being directly connected to the casing body 21. It is noted that the concave face 26 and the radial face 27 are located on either side of an edge 29.

Under the effect of the contact with the nozzle guide, the upper face 25 of the plate and the concave face 26 are likely to be damaged. Yet, the connection portion 24 being submitted to strong stresses, a machining springback is to be avoided on the concave face 26 of the connection portion 24.

Figure 3:
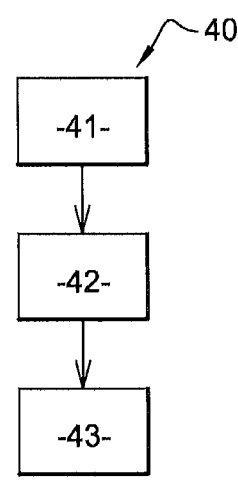

FIG. 3 schematically depicts the steps of a method 40 for repairing the upstream rail 20. The method 40 includes:
a step of covering 41 a surface with a solder 33, said surface including the lower face 32, the downstream side face 31 and the upper face 25 of the plate, and the concave face 26 of the connection portion 24. Covering is performed so that the solder 33 extends substantially until the edge 29.

Figure 4:
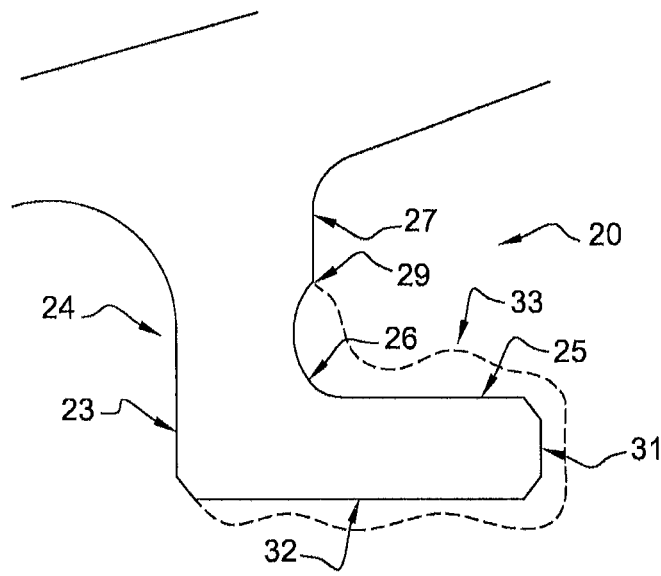

FIG. 4 shows the upstream rail 20 of the third turbine stage, at the end of the covering step. It is noted that, according to a preferred embodiment, covering is performed by Tungsten Inert Gas (TIG) welding, well known to those skilled in the art. Furthermore, the solder 33 is ideally of the same material as the upstream rail, in order to avoid material discontinuities in the repaired upstream rail.

Figure 5:
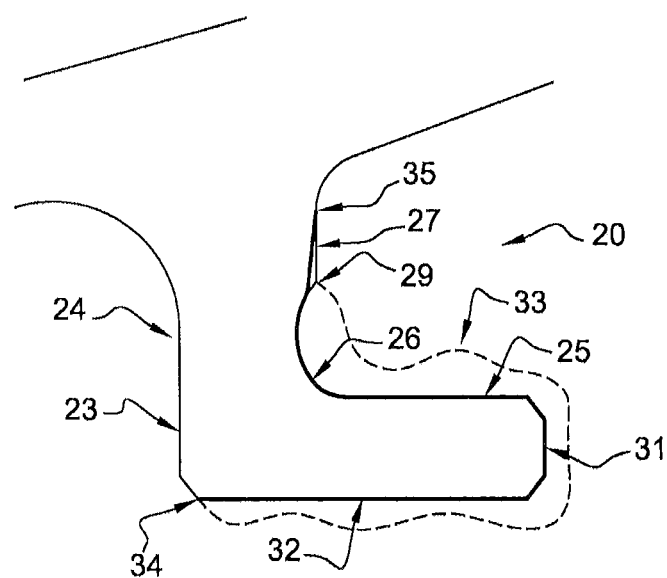

A step of machining 42 the covered surface, from the lower face 32 of the plate 23 and in the direction of the radial face 27, such that machining ends in the radial face 27. Indeed, a machining springback in the radial face 27 is not likely to embrittle the upstream rail 20, the area close to the vertical line 27 being the least strained area of the upstream rail 20. Machining is performed in a single action in order to avoid intermediate machining springbacks, and possibly in several passes. At the end of machining, the surface is reshaped, suppressing wear traces on the upper face 25 of the plate 23 and on the concave face 26 of the connection portion 24. FIG. 5 shows, with the thick line 34, the machining profile. It is noted that the radial face 27 includes a machining springback 35.

A step of machining 43 the radial face 27 to suppress residues of solder 33 which could have disseminated on the radial face 27. Machining is light, with a maximum depth of 0.1 millimetre.

This method enables an exit of the machining tool in the least strained area of the upstream rail (that is at the radial face) and remote from the wear area which initiated the repair.

It is noted that this method is adapted to repair upstream rails of all the turbine stages, although these rails have slightly different profiles. Indeed, whatever the upstream rails to be repaired, they all have a base including a radial face, a plate comprising an upper face, and a connection portion including a concave face.

The invention claimed is:

1. A repaired upstream rail of a turbine engine turbine casing, said casing including a casing body extending along a longitudinal axis, said upstream rail comprising:
a base including a radial face, extending substantially radially from the casing body,
a plate including an upper face, extending substantially along the longitudinal axis,
a connection portion between the base and the plate, including a concave face connecting the radial face and the upper face, the concave face and the radial face extending on either side of an edge, said repaired upstream rail including:

a covered surface with a solder, said covered surface including the upper face and the concave face, such that said solder extends until the edge, and the covered surface has been reshaped by machining on a portion of the radial face to form a repaired concave face.

2. The upstream rail according to claim 1, wherein a depth of the machining of the radial face is at most 0.1 mm.

3. The upstream rail according to claim 1, wherein the solder is applied by Tungsten Inert Gas welding.

4. The upstream rail according to claim 1, wherein the covered surface includes a downstream side face and a lower face of the plate.

5. The upstream rail according to claim 1, wherein the covered surface has no machining springback in the concave face.

* * * * *